(12) United States Patent
Stimek et al.

(10) Patent No.: US 9,016,587 B1
(45) Date of Patent: Apr. 28, 2015

(54) SYSTEM AND METHOD OF TAGGING AN ORDNANCE

(71) Applicants: Christopher M. Stimek, Fort Worth, TX (US); Roger Q. Paulsel, Weatherford, TX (US)

(72) Inventors: Christopher M. Stimek, Fort Worth, TX (US); Roger Q. Paulsel, Weatherford, TX (US)

(73) Assignee: WilliamsRDM, Inc., Fort Worth, TX (US)

( * ) Notice: Subject to any disclaimer, the term of this patent is extended or adjusted under 35 U.S.C. 154(b) by 191 days.

(21) Appl. No.: 13/688,117

(22) Filed: Nov. 28, 2012

Related U.S. Application Data

(60) Division of application No. 13/555,134, filed on Jul. 21, 2012, now Pat. No. 8,444,059, which is a continuation of application No. 13/423,191, filed on Mar. 17, 2012, now Pat. No. 8,245,945, which is a continuation of application No. 12/783,468, filed on May 19, 2010, now Pat. No. 8,167,213.

(51) Int. Cl.
| | |
|---|---|
| *G06K 19/06* | (2006.01) |
| *G06K 19/073* | (2006.01) |
| *G06K 19/077* | (2006.01) |
| *G06K 19/07* | (2006.01) |
| *F42B 5/26* | (2006.01) |

(52) U.S. Cl.
CPC ........ *G06K 19/073* (2013.01); *G06K 19/07758* (2013.01); *G06K 19/0723* (2013.01); *F42B 5/26* (2013.01)

(58) Field of Classification Search
CPC ..................... G06K 19/07749; G06K 19/0723; G06K 19/07758; G06K 19/07794; G06K 19/07786; H01Q 1/2225; H01Q 1/2208

USPC ............ 235/492, 382; 340/10.1, 10.33, 572.8
See application file for complete search history.

(56) References Cited

U.S. PATENT DOCUMENTS

| | | |
|---|---|---|
| 4,442,431 A | 4/1984 | Bleakney |
| 4,852,455 A | 8/1989 | Brum |
| 5,029,773 A | 7/1991 | Lecat |
| 5,570,854 A | 11/1996 | Brum et al. |
| 6,055,909 A | 5/2000 | Sweeney |
| 6,554,188 B1 | 4/2003 | Johnson et al. |

(Continued)

OTHER PUBLICATIONS

K. Shubert et al, Enhanced Electromagnetic Tagging for Embedded Tracking of Munitions and Ordnance During Future Remediation Efforts. Final Technical Report. pp. 1-112. Jun. 3, 2007, Columbus, OH, US.

*Primary Examiner* — Allyson Trail
(74) *Attorney, Agent, or Firm* — Morani Patent Law, PC

(57) ABSTRACT

A method and system for attaching a radio frequency identification (RFID) tag to an ordnance is provided. By tailoring the packaged tag and electronics to accommodate existing ordinance body cavities the integrity of the bomb casing is maintained. Likewise, fin assemblies also remain intact and are mounted in a conventional manner to the tagged ordinance. Numerous ordinance types, to include the mark (MK) 80 series general purpose bombs and equivalents are compatible with the tagging method and system described herein. Set screw mounted tail assemblies of various fin configurations are readily assembled onto the metal body casings of tagged ordinances. A curved dipole antenna provides access to external query signals and transmission of tag locating signals. As described herein, tag antennas can mount between ordinance assembly parts, adding to the ease of retrofitting existing ordinance inventory for a RFID tag localizing system.

3 Claims, 15 Drawing Sheets

(56) References Cited

U.S. PATENT DOCUMENTS

| | | |
|---|---|---|
| 6,729,240 B1 * | 5/2004 | Smith et al. .................. 102/206 |
| 6,795,174 B1 | 9/2004 | Miller |
| 6,817,568 B2 | 11/2004 | Spate et al. |
| 7,652,488 B1 | 1/2010 | Lopatin |
| 7,926,356 B1 | 4/2011 | Lopatin |
| 7,931,486 B1 | 4/2011 | Walters |
| 2004/0051588 A1 * | 3/2004 | Krvavac ........................ 330/302 |
| 2004/0074974 A1 | 4/2004 | Senba et al. |
| 2004/0169107 A1 | 9/2004 | Spate et al. |
| 2005/0030219 A1 | 2/2005 | Friedrich et al. |
| 2006/0170551 A1 | 8/2006 | Nakamura et al. |
| 2006/0244612 A1 * | 11/2006 | Pridmore et al. .......... 340/573.2 |
| 2007/0159338 A1 * | 7/2007 | Beber et al. ................ 340/572.8 |
| 2007/0279229 A1 * | 12/2007 | Shaffer et al. ............. 340/572.1 |
| 2008/0204145 A1 * | 8/2008 | Dow ............................ 330/285 |
| 2008/0207357 A1 | 8/2008 | Savarese et al. |
| 2009/0053678 A1 | 2/2009 | Falkenhayn et al. |
| 2009/0219158 A1 * | 9/2009 | Nikitin et al. .............. 340/572.7 |
| 2009/0224890 A1 * | 9/2009 | Kim ........................ 340/10.33 |
| 2011/0156812 A1 * | 6/2011 | Parkhurst et al. ......... 330/124 R |
| 2012/0031981 A1 * | 2/2012 | Westlake et al. ............... 235/492 |
| 2012/0060672 A1 | 3/2012 | Grigg |
| 2014/0209673 A1 * | 7/2014 | Phillips ........................ 235/380 |

* cited by examiner

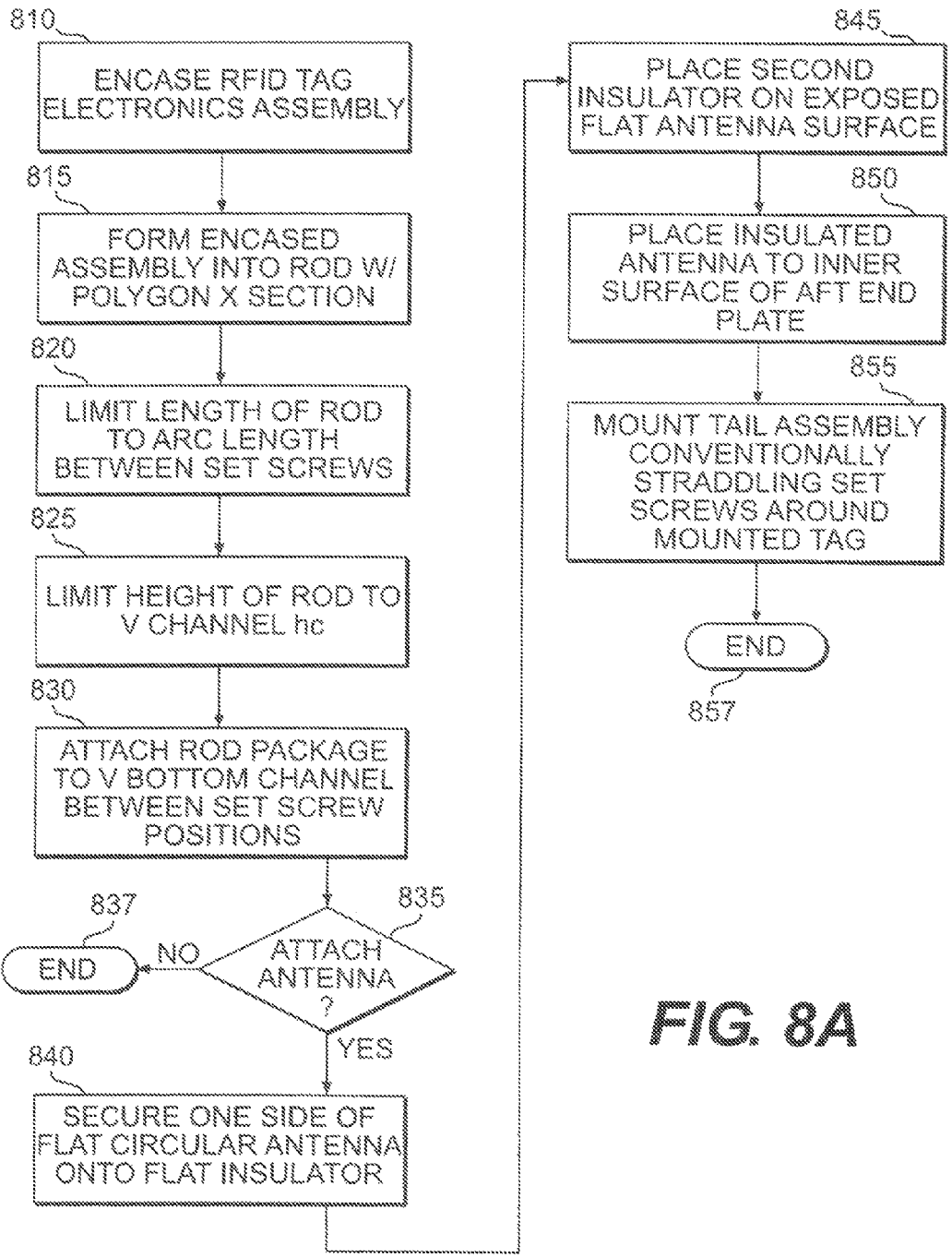

SYSTEM AND METHOD OF TAGGING AN ORDNANCE

CROSS REFERENCE TO RELATED APPLICATIONS

The present application is a Divisional Application of U.S. patent application Ser. No. 13/555,134, filed 21 Jul. 2012, which is a Continuation of U.S. patent application Ser. No. 13/423,191, filed 17 Mar. 2012, now U.S. Pat. No. 8,245,945, which is a Continuation of U.S. patent application Ser. No. 12/783,468, filed 19 May 2010, now U.S. Pat. No. 8,167,213, the entire contents of which are incorporated by reference.

STATEMENT REGARDING FEDERALLY SPONSORED RESEARCH OR DEVELOPMENT

This invention was made with government support under Contract No. FA8224-09-C-0044, between the Department of Defense and Williams-Pyro, Inc. The government has certain rights in the invention.

BACKGROUND OF THE INVENTION

The present invention relates generally to a method and system of tagging unexploded ordinances, and more particularly to a method of and system for attaching a radio frequency identification (RFID) tag to a metal ordinance.

It has been shown that a RFID system can provide a means for detecting and localizing unexploded ordinances in a field environment.[1] Attaching a RFID tag to an ordinance poses numerous challenges. One of ordinary skill recognizes the need for a mounted tag to withstand the physical forces associated with landing impact. Lesser forces, which may also compromise the tag's integrity, include those applied in handling, assembling, and loading. Launch of the ordinance presents yet another set of forces which a mounted tag would need to withstand. It is also desirable for the attachment itself to be rugged enough to survive the forces of landing impact, such that the tag remains associated with the ordinance.

A RFID tag will have an antenna for communication with, for example, a reader. Many ordinances, to include general purpose bombs, have an outer metal casings. Signal receipt and transmission from a tag antenna housed within a metal casing would be quite impaired. Mounting an antenna on a bomb exterior poses challenges, which include surviving impact.

Tail kits are conventionally attached to many ordinances and are chosen to provide a desired flight speed and trajectory. It would be desirable for the tag when mounted to have an insignificant or undetectable effect on ordinance aerodynamics and target penetration. It is also desirable to be able to retrofit existing ordinance inventory with a RFID tag. It would be desirable to have a tagging method which was compatible with numerous ordinances in various configurations.

Conventionally, RFID tags have been mounted to mark (MK) 52 practice bombs. The MK 52 has a dough molded body and a composite fin. The MK 52 bomb is adopted for the 500-lb MK 82 bomb and is used, for example, for practicing delivery techniques.[2] FIG. 1A shows a conventional MK 52 100 with its dough body 110, composite tail assembly 120, and nose assembly 135. Conventional tag mounting protocols include cutting grooves into the aft of the tube body 125. Another similar conventional mounting protocol includes cutting grooves in each tail fin 120-1-120-4. FIG. 1B shows one of four fins 120-1 with a groove of composite 126 removed and replaced with epoxy 140. A tag 142 is set in the epoxy. In accordance with this conventional method, each fin of tail assembly 120 has a groove cut and filled with epoxy and or a tag with epoxy, not shown.

Removing equal grooves in each fin of the tail assembly 120 and filling the same with epoxy may decrease the effect of modifying the fin on the ordinance's aerodynamics. While cutting grooves in a dough or composite material may be efficient, the same method may be significantly less efficient in metal, for example steel.

Referring to FIG. 1A, yet another conventional method of mounting a tag in a MK 52 is to mount the RFID tag between the nose 135 and the body 110. Since the subject body is non-metal, electromagnetic energy may penetrate the casing to energize a passive tag. However, a passive tag mounted in a metal casing body would not receive the same needed energy transfer from a reader. The tags mounted in the MK 52s were passive.[1] The nose assembly of the practice MK 52 is relatively simple and consistent across MK 52s. In contrast, the nose assemblies of any of the MK 80 series body ordinances varies considerably depending on the type of ordinance and affixing a tag into this region may not be feasible. These tag mounting methods do not readily translate into viable or practical tag mounting techniques for the metal casing and metal fins of general purpose bombs, guided ordinances, or metal casing practice bombs.

It would be desirable to have a tag mounting method and system which had minimal effect on bomb aerodynamics. It would also be desirable if the system and method were applicable to a wide range of ordinance types. And it would be desirable if metal casing bombs could be readily retrofitted with a tag mounting system and method. The mounted RFID tag must be rugged and reliable. Ruggedness is needed to withstand the launching of the ordinance and its destination impact as well as any intermediate contacts.

SUMMARY OF THE INVENTION

The present invention addresses some of the issues presented above by providing a method and system of attaching an active RFID tag to a metal casing bomb comprising a metal MK 80 series or equivalent body. A system and method in accordance with the present invention does not require removing metal from the ordinance body or fin. The system and method in accordance with embodiments of the present invention are readily applied to a multitude of bomb configurations comprising a MK 80 series body and equivalents and conventional fin assemblies and equivalents. Here, the term conventional refers to ready availability to one of ordinary skill and does not refer to an ordinance type, e.g. conventional versus nuclear or low drag versus guided. Aspects of the present invention are provided for summary purposes and are not intended to be all inclusive or exclusive. Embodiments of the present invention may have any of or none of the aspects below.

One aspect of the present invention is to maintain the integrity of the metal ordinance body.

Another aspect of the present invention is to maintain the integrity of various tail assemblies.

Another aspect of the present invention is to be compatible with general purpose, guided, and practice bombs comprising a MK 80 series body.

Another aspect of the present invention is to provide compatibility across military department ordinances utilizing a MK 80 series body or equivalents, to include, for example, a bomb live unit (BLU).

Another aspect of the present invention is that it may be used to readily retrofit existing ordinance inventory.

Yet another aspect of the present invention is the utilization of existing spaces in a multitude of ordinances.

Yet another aspect of an exemplary embodiment of the present invention is the use of two RFID tags, at different mounting locations and with different configurations, to provide additional system reliability.

Another aspect of the invention is rapid assembly of its components during ordinance build up. Another aspect of the invention is the compatibility with conventional bomb assembly, affording timely assembly in multiple ordinance configurations. And yet another aspect of the invention is the ready disassembly of the tag assembly from a non-deployed ordinance if desired.

Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein:

FIG. 8A shows a block diagram of a method of attaching a RFID tag to an aft end of a conventional MK 80 series body or equivalent bomb body and assembling a conventional tail assembly or equivalent onto the tag mounted body, in accordance with an exemplary method of the present invention;

DETAILED DESCRIPTION OF THE INVENTION

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are merely illustrative of ways to make and use the invention, and do not limit the scope of the invention.

Figure 2:
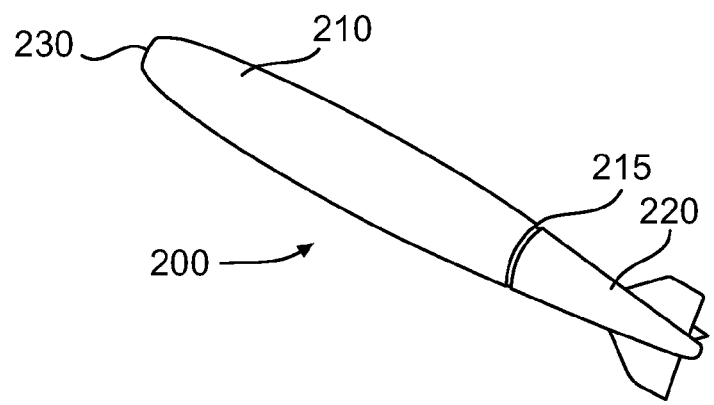
FIG. 2 illustrates parts of a conventional MK 80 series bomb.

FIG. 2 shows a conventional 500 pound mark MK 82 bomb and serves to illustrate parts of an ordinance common to bombs in the general purpose bomb series, to include the MK 80 series. (*General Dynamics*, Garland, Tex., U.S.A) The MK 82 general purpose bomb 200 is shown with a low drag tail kit 220 attached to the aft 215 metal body casing 210. At the opposite end of the metal casing body is the nose end 230 to which various nose assemblies may be attached. The outer surface of the metal casing 210 and the tail kit 220 may be painted, not shown. In contrast the MK 52 has a dough molded body and a composite fin, a MK 80 series bomb has a metal body casing.

Figure 1A:
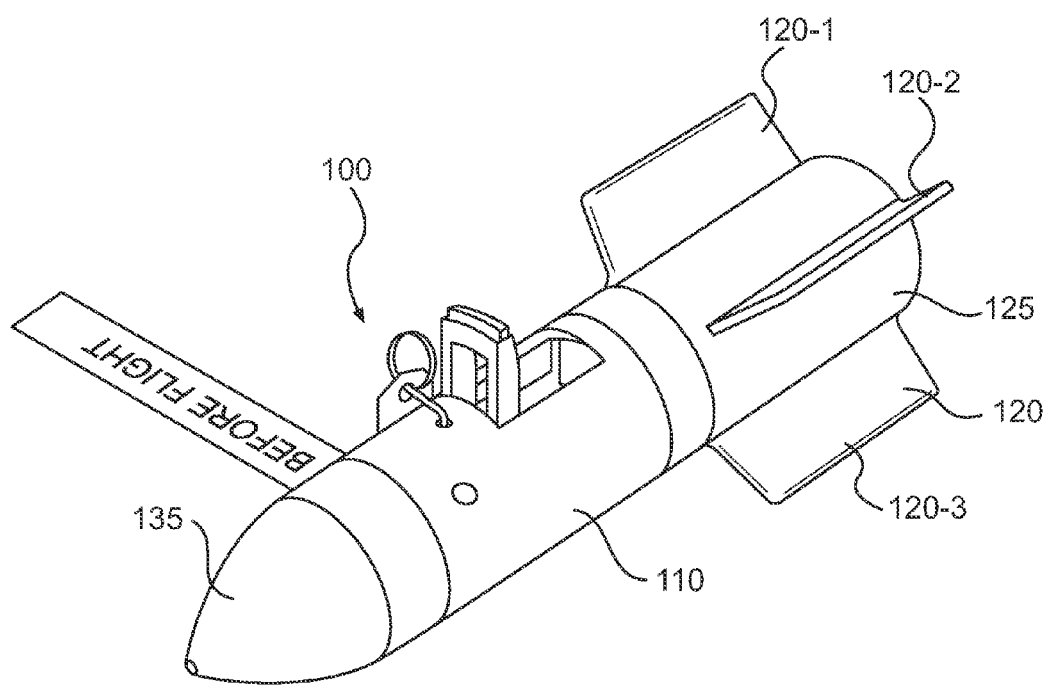
FIGS. 1A and 1B show a conventional MK 52 and a conventionally mounted RFID tag on a vane of the MK 52 fin, respectively.
Figure 1B:
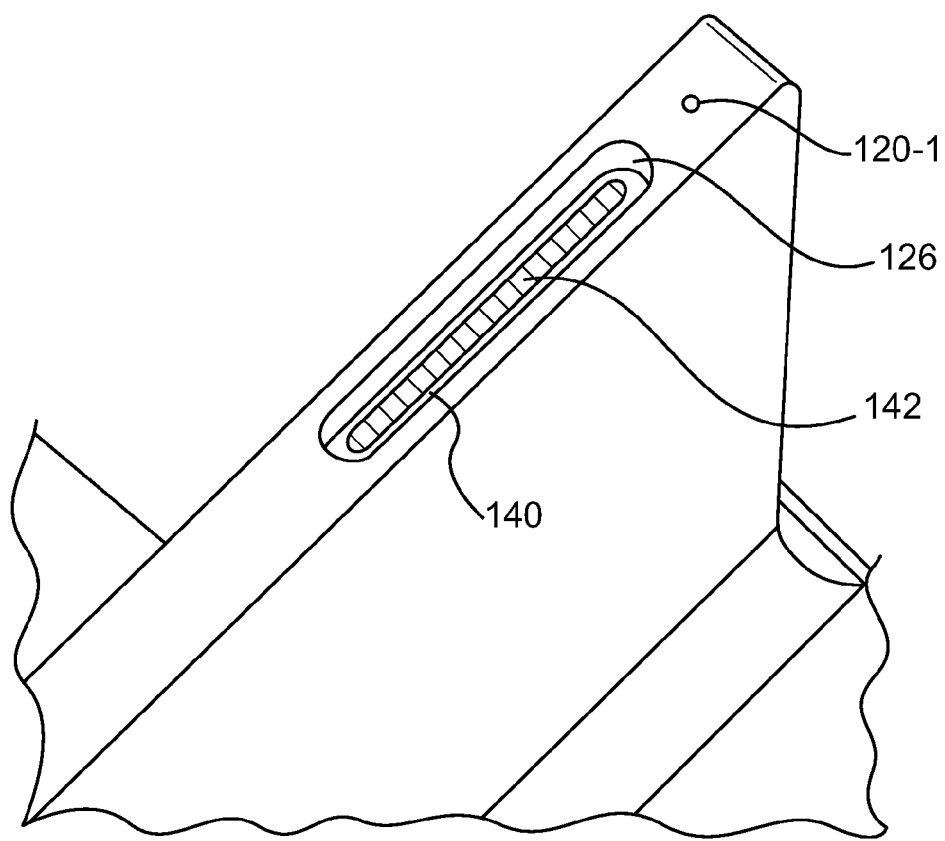

Unlike the composite fins of FIG. 1B, many conventional tail assemblies are made of steel and are not easily grooved. Conventionally, as shown in FIG. 1B, a portion of the fin composite is removed 126 forming a cavity. A RFID tag is set in epoxy 142 and then mounted in the cavity using additional epoxy to fill the cavity 140. It may not be possible to use this conventional method to retrofit existing bombs. In addition, avoiding fin modification may be desirable to maintain accuracy and desired aerodynamics.

Figure 3:
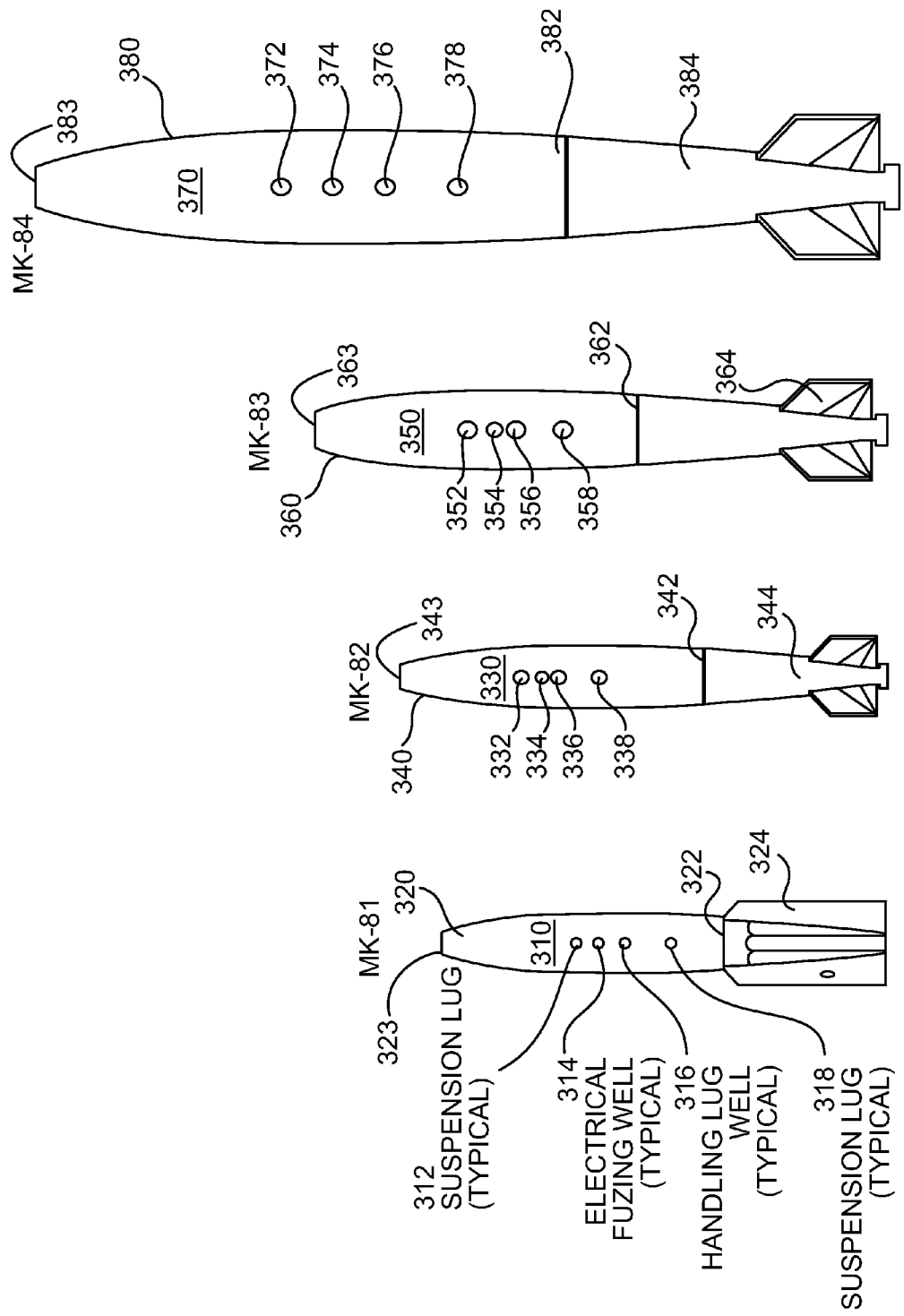
FIG. 3 shows an approximation of the relative sizes of MK 80 series bodies with tail assemblies mounted.

FIG. 3 shows four different sizes of general purpose MK 80 series bombs 310, 330, 350, 370, namely the MK 81, MK 82, MK 83, and MK 84, respectively. Each body casing 320, 340, 360, 380 has a nose end 323, 343, 363, 383 and an aft end 322, 342, 362, 382. Attached to each aft end is a tail assembly 324, 344, 364, and 384.

Figure 4:
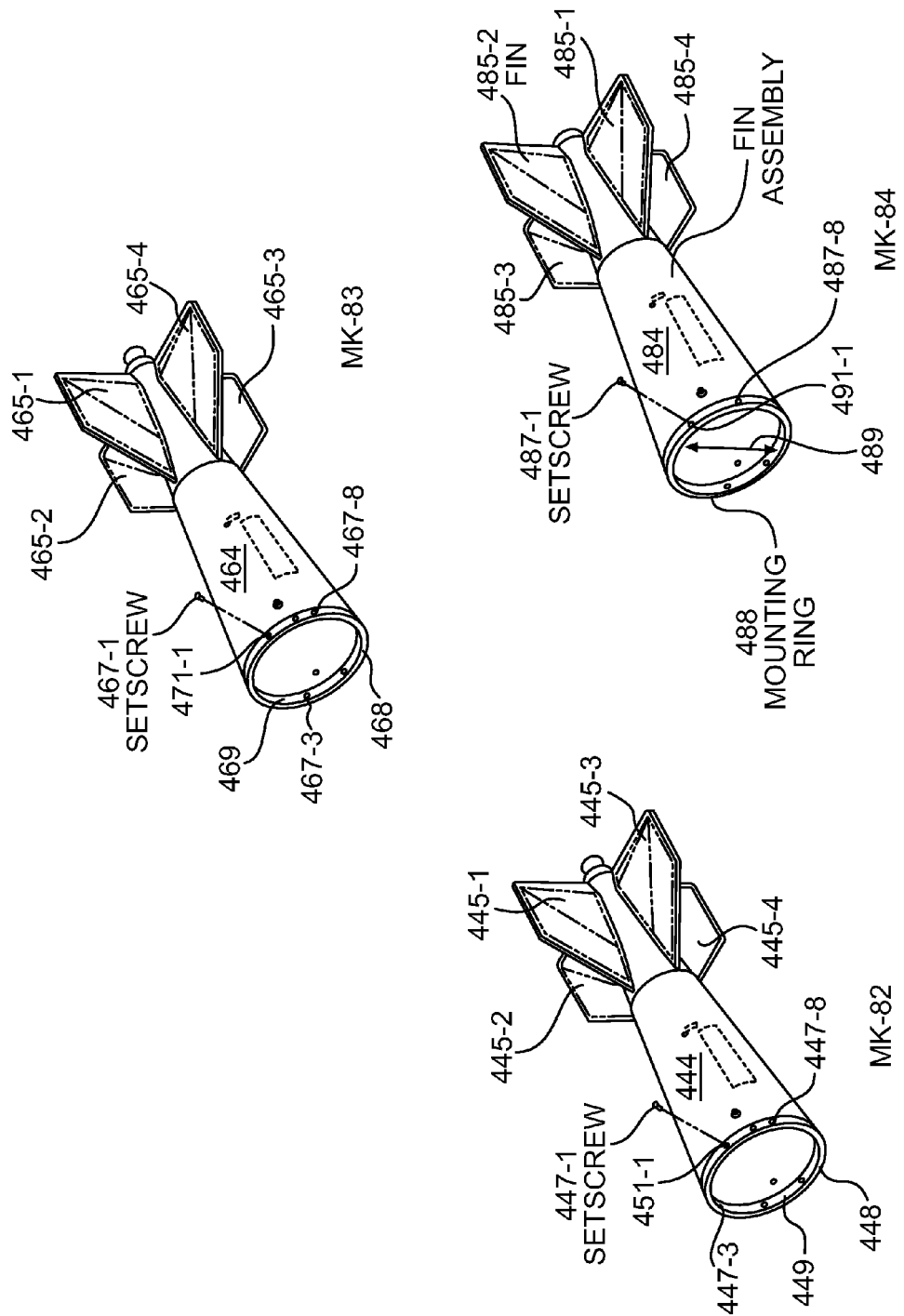
FIG. 4 shows three low drag fins with a set screw mounting mechanism in greater detail, each compatible with a MK 80 series bomb body and with exemplary embodiments of the present invention.

FIG. 4 shows three low drag fin tail assemblies with a set screw mounting mechanism in greater detail. Each tail assembly is compatible with a MK 80 series bomb body and with exemplary embodiments of the present invention. Tail assemblies 444, 464, and 484 are compatible with MK 82 344, MK 83 364, and MK 84 384, respectively, shown for example in FIG. 3. Each of the low drag fin assemblies includes four fins, for example 485-1-485-4 on tail assembly 484. Still referring to tail assembly 484, a mounting ring 488 is at the opposite end of the fins and shown on each tail assembly 448, 468.

Turning to tail assembly 484, each mounting ring has eight threaded holes through which set screws 487-1-487-8 thread. Set screw 487-1 is shown removed from threaded hole 491-1. The number of tail assembly mounting set screws may vary across ordinance type and size and/or across tail assembly type. A MK 82 low drag tail assembly may mount, for example, with six set screws, while a joint Direct Attack Munition (JDAM) tail kit may mount with eight set screws.

Figure 5A:
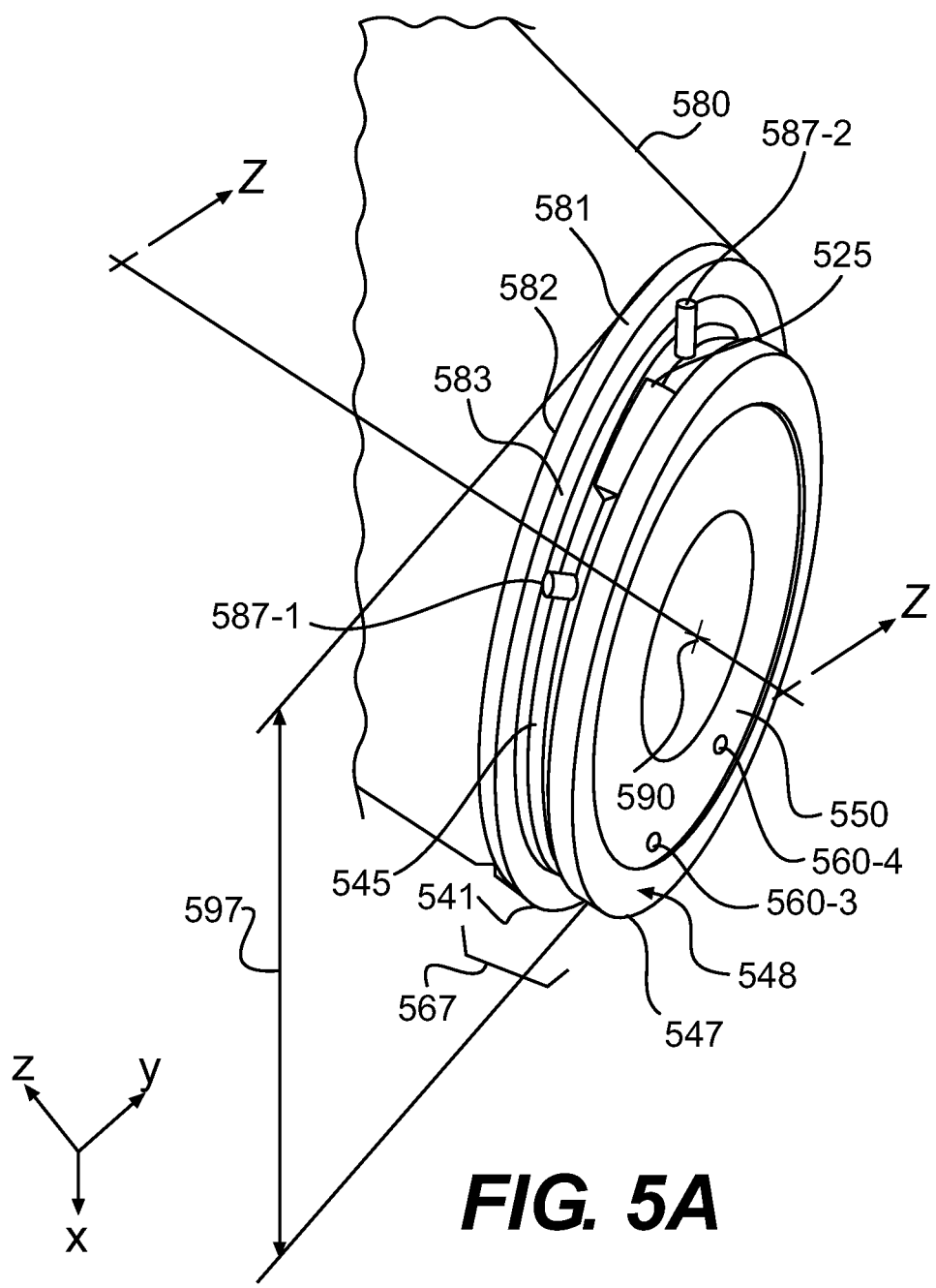
FIGS. 5A-5C show the aft end of a MK 80 series body in greater detail with RFID tags attached in accordance with exemplary embodiments of the present invention.
Figure 5B:
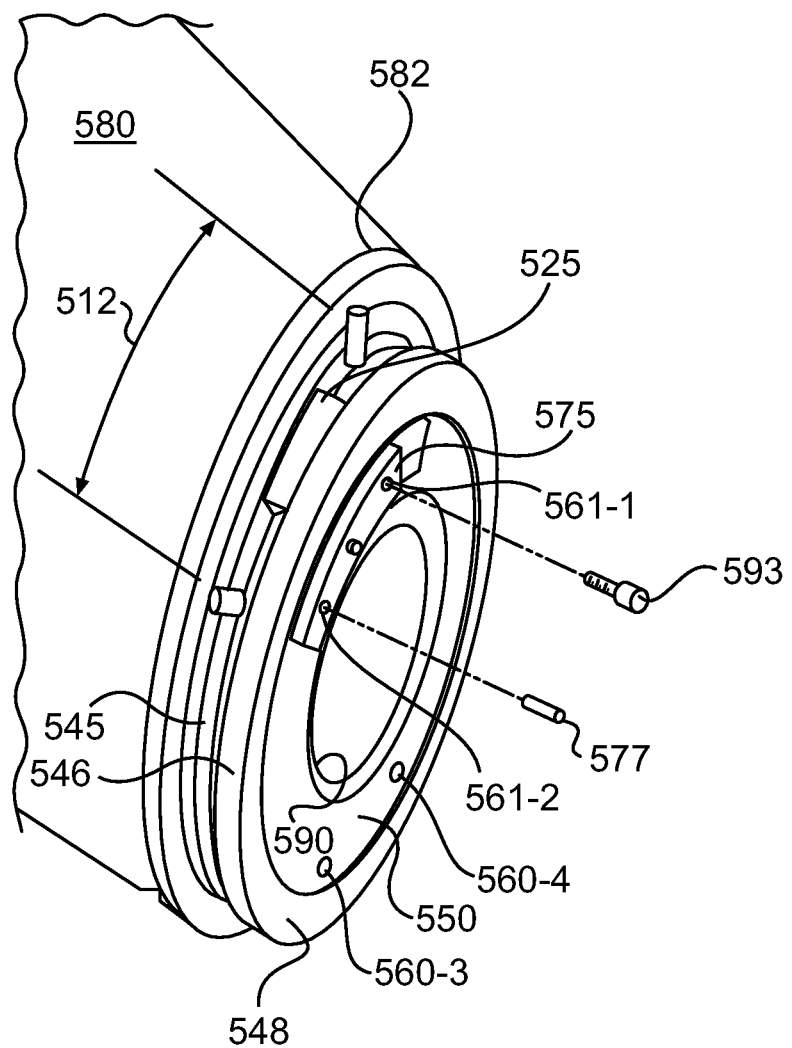

FIGS. 5A and 5B show the aft end 582 of a MK 80 series body in greater detail with RFID tags attached in accordance with exemplary embodiments of the present invention. Turning first to FIG. 5A, two set screws, which would be present upon attachment of a compatible tail assembly, are shown 587-1, 587-2. In practice eight set screws may be placed at forty-five degree separations as measured from the aft body center 590 to secure the tail assembly. The set screws 587-1, 587-2 are shown in channel 545 which is formed within an aft body plate 567 secured to the aft end of the bomb body 582. The aft body plate 567 comprises two flanges 581, 548. The outer radius 547 of the outer flange 548 is smaller than outer radius 541 of the inner flange 581, where the inner flange 581 mounts onto the aft body end 582. Turning to FIG. 4, the inner diameter 489 of respective fin assembly 484 is greater than twice the outer flange radius 547 but less than twice the inner flange radius 541 of FIG. 5A. The mounting ring 488, for example, of fin assembly 484, shown in FIG. 4, slides over radius 547 and abuts against face 583 of FIG. 5A.

The increase in weight of MK 80 series ordinances across MK 81 through MK 84 corresponds to an increase in body size, as shown in FIG. 3 320, 340, 360, 380. A corresponding increase in aft body diameter 597 exists, shown for example in FIG. 5A. In turn, the arc length 512 between set screws, as shown in FIG. 5B, and radius of curvature will also increase while the angular degree of separation between set screws may remain constant in conventional tail assemblies. The set screw placement in FIG. 5B may not represent the set screw separation in practice. With an increase in arc length between set screws, a longer tag assembly is possible, in accordance with the present invention.

Figure 6A:
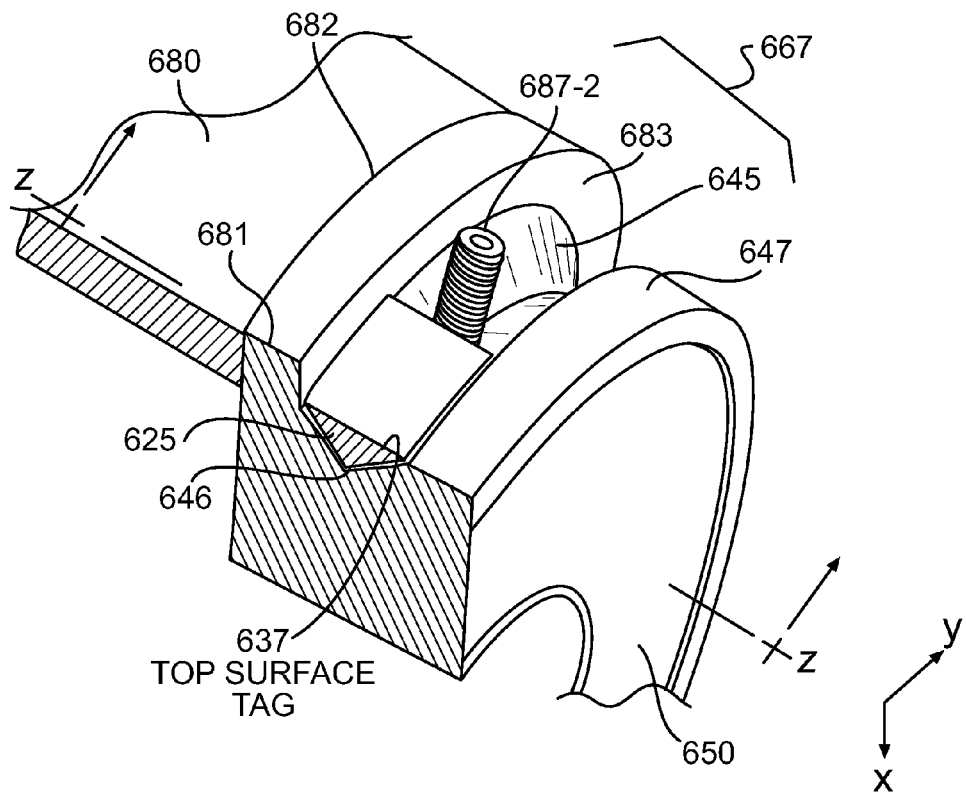
FIG. 6A shows an isometric view of the aft body of a MK 80 series bomb, channel, and RFID tag with a medial cutaway along the length of the body, in accordance with an exemplary embodiment of the present invention.

FIG. 6A shows an isometric view of the aft body of a MK 80 series bomb, channel, and RFID tag with a medial cutaway along the length of the body 680 in direction z, in accordance with an exemplary embodiment of the present invention. The v-shaped bottom 646 of the channel 645 is visible. A tag 625 rests in the bottom of the channel and extends upwards, while remaining below the height of the outer flange 647. The tag 625 extends along the channel arc towards set screw 687-2 but has adequate clearance to avoid contact with set screw 687-2. In accordance with embodiments of the present invention, the RFID tag and its epoxy encapsulate extend between two adjacent set screws while remaining free from set screw contact. The tag may extend part way up the face 683 the inner flange 681 of the aft body plate 667.

Figure 6B:
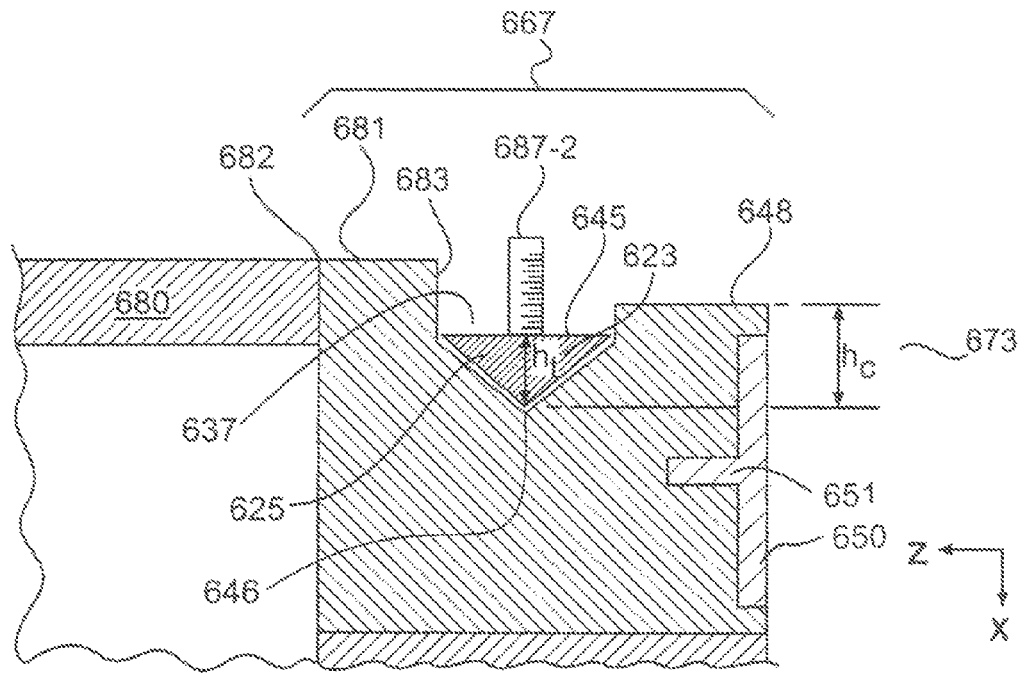
FIG. 6B shows a cross section along line Z-Z in the direction of y of FIG. 6A
Figure 6C:
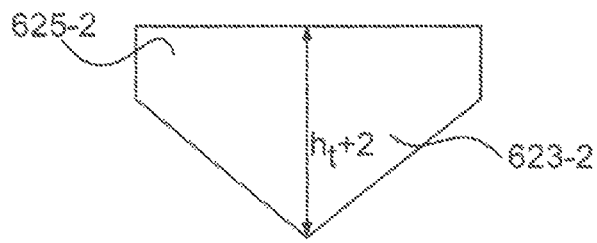
FIG. 6C shows a same cross section view of another embodiment of a channel mounting RFID tag, in accordance with another exemplary embodiment of the present invention.

FIG. 6B shows a cross section view along line Z-Z in the direction of y of FIG. 6A. The metal body casing 680 is adjacent to the aft body plate 667. An edge of the aft body plate 667 comprises an inner rim 681 and outer rim 648. A v channel 645 is formed between the inner and outer rims 681, 648. Two exemplary embodiments of a tag, in accordance with the present invention, are shown. A cross section of the tag may be triangular 625. The height ht 623 of a tag cross section does not exceed the height of the channel hc 673, as shown in FIG. 6B. Similarly, the height of a polygon cross section ht+2 623-2 may not exceed height hc 673, as shown in FIG. 6C. Tag cross sections 625 and 625-2 are exemplary and maximize the cross section available in the v channel 645 while still accommodating set screw mounting 687-2 of conventional tail assemblies and equivalents. FIG. 6B, also shows a cross section of the cap 650, which may bolt 651 into the aft body plate 667.

In accordance with embodiments of the present invention, an alternate or second tag assembly may be desired. Referring to FIG. 5A, the tail assembly, not shown, may separate or shear from the aft end 582 of a bomb body 580 upon impact. In turn, a tag 525 mounted in the channel 545 could be damaged or displaced. Turning to FIG. 5B, tag 575 represents a second tag assembly configuration. The tag 575 mounts on the outer cap surface 550. The tag may be curved, as shown, and will be disposed between the outer flange 548 and the inner fuse well 590. In accordance with an exemplary embodiment of the present invention, the tag assembly will span a length which exceeds a separation between two adjacent cap holes 560-3, 560-4. Two additional cap holes, not shown, are underneath tag 575.

Turning to FIG. 5B, at each end of the tag 575 are through holes 561-1, 561-2, which align with two adjacent cap holes underneath tag 575. An alignment pin 577 passes through a first hole 561-2. The second hole 561-1 is not threaded. A cap screw 593 passes through hole 561-1 in 575 and turns into a threaded cap hole behind, securing the tag assembly.

Figure 5C:
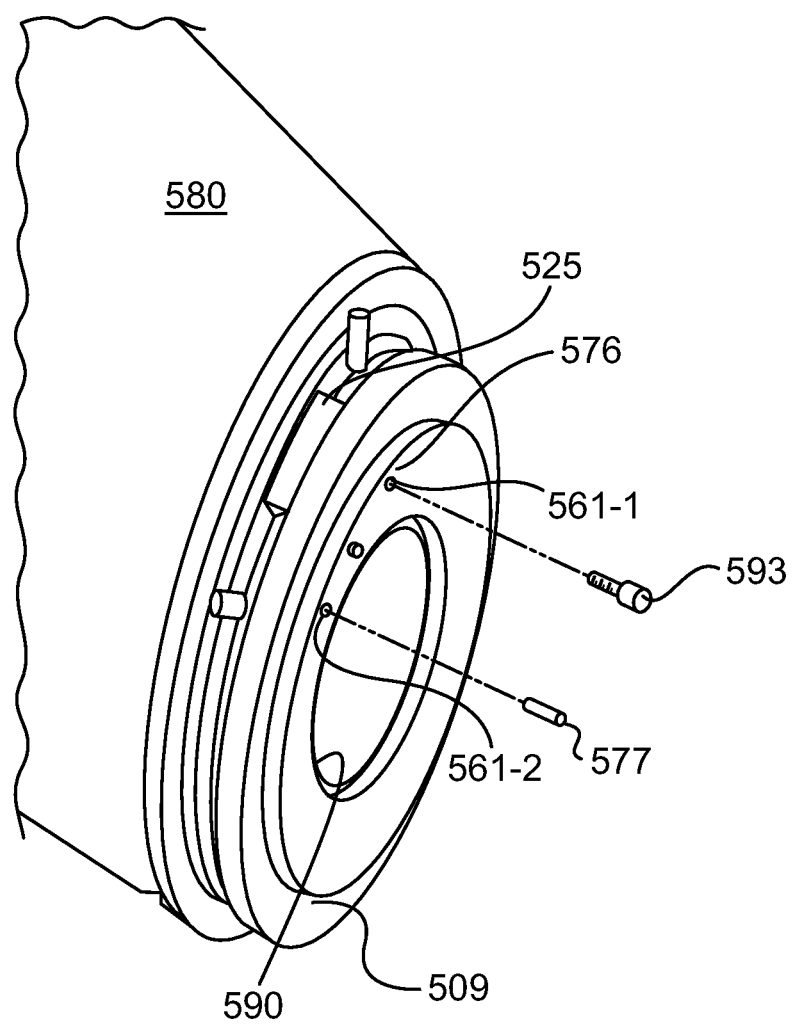

FIG. 5C shows another tag assembly configuration 576. This tag assembly encircles the fuze well 590. Holes in the tag 576 align with cap 550 holes beneath the tag. A cap screw 593, such as may also be used in the tag embodiment 575, is shown. An aligning pin 577 is also shown aligned with a hole 561-2 in tag 576. The placement of the cap screw and alignment pins may vary in accordance with embodiments of the present invention. One or more cap screws may be used. A curved tag 576 may have a combination of aligning pins and cap screws filling in available spanner wrench holes and threaded holes, not shown, in the cap 550 and passing through corresponding holes in tag 576. In a curved tag 576, two or more cap screws may be used and aligning pins may not employed. In accordance with exemplary embodiments of the present invention, in MK 80 series bombs and equivalents, the v channel groove 545 may extend the circumference of the aft body end plate, where the complete circumference is not shown in the figures, for example FIGS. 5B and 5C.

Embodiments of tag assemblies, to include those shown in FIGS. 5A-5C, 525, 575, 576, may be encased in an epoxy, a polymer or a plastic, in accordance with the present invention. Epoxy may be used to provide adhesion to the bomb surface during attachment. An encased tag assembly may include a battery. For the tag assembly embodiments, such as 575 and 576, which mount on the outer surface of the cap 550, an antenna may be incorporated into the tag assembly. For the configuration of 576, a curved dipole antenna may be used. An exemplary curved dipole antenna is described below in reference to FIGS. 10A-10B.

Cap-mounted tag embodiments such as 575 and 576 may survive the loss of a tail assembly on impact. Loss or compromise of the tail assembly can provide outside access to an otherwise metal enclosed antenna, such as an antenna encased in a cap mounted tag assembly. In accordance with one embodiment, only a cap mounted tag is attached to a given ordinance. In another embodiment only the channel mounted tag 525 is attached to the ordinance, and in yet another embodiment a channel mounted tag 525 and a cap mounted tag 575 are both attached to a given ordinance. In still another embodiment, a channel mounted tag functions as the primary tag and a cap mounted tag functions as a secondary tag.

Figure 5D:
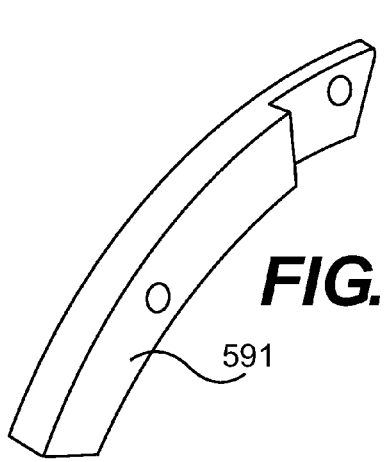
FIGS. 5D-5E show front and rear isometric views, respectively, of a cap mounting tag, in accordance with an exemplary embodiment of the present invention.
Figure 5E:
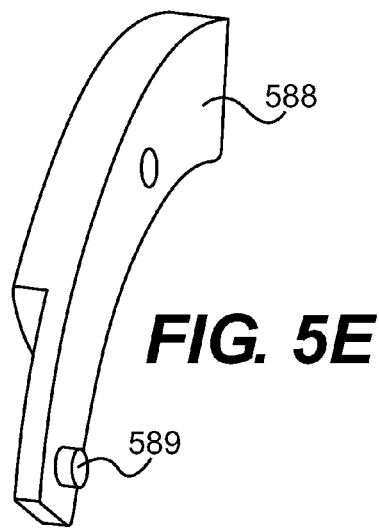

FIGS. 5D-5E show a front and a rear isometric view of a cap mounted tag assembly, respectively, in accordance with an exemplary embodiment of the present invention. A like tag is shown mounted in FIG. 5B. The rear face 588, FIG. 5E, mounts on an exposed cap surface, not shown. The front face 591 faces outward when the tag assembly is mounted on a cap. An alignment pin, 589 is shown extending out the rear face 588. However, in accordance with an exemplary embodiment, the alignment pin is incorporated into the cap mounted tag assembly and is not a separate pin, easing assembly and reducing potential foreign object damage.

Figure 7:
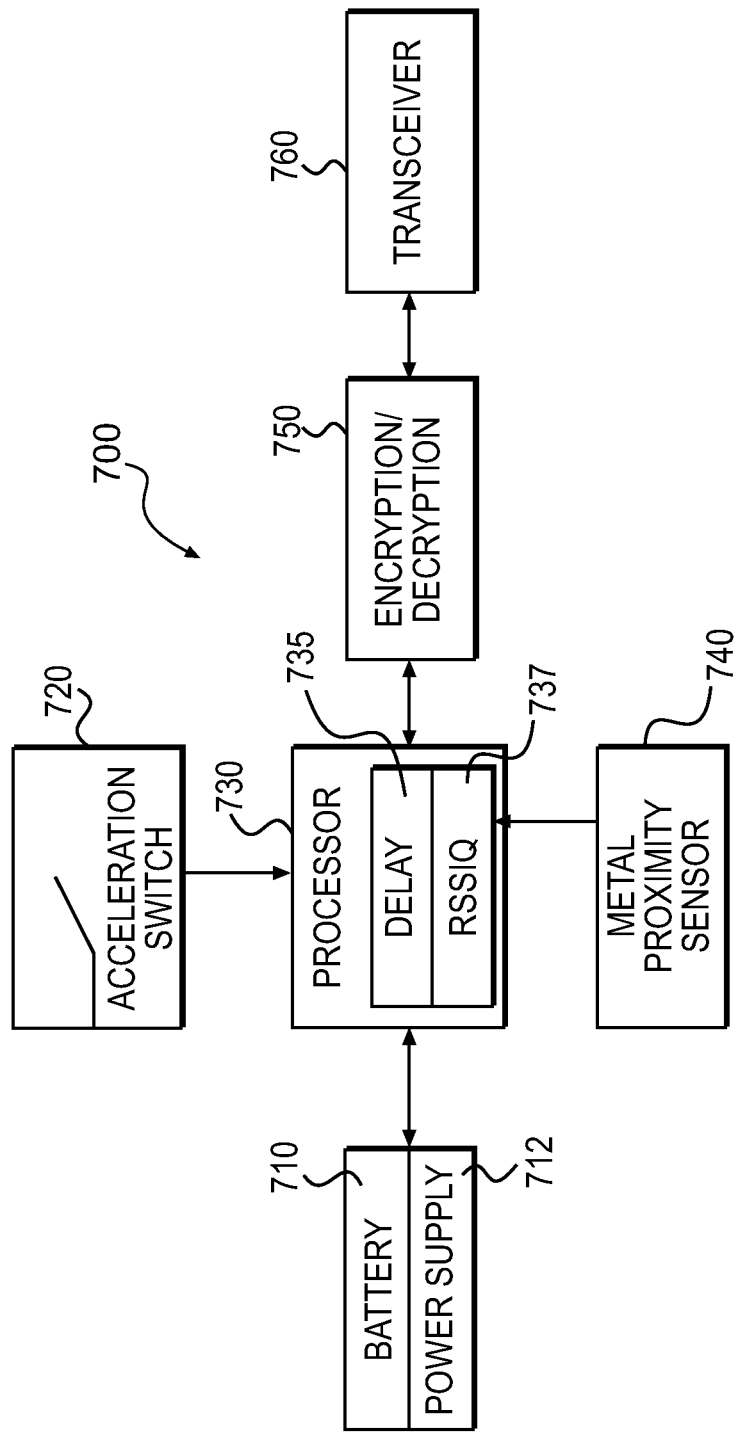
FIG. 7 shows a block diagram of tag components to be encased in a desired shape, in accordance with an exemplary embodiment of the present invention

FIG. 7 shows a block diagram of tag electronics to be encased, in accordance with an exemplary embodiment of the present invention. The tag may not consume battery power before launch and impact of the ordinance. Acceleration switch 720 closes the connection between the battery 710 and power supply electronics 712 and the processor 730. In accordance with one exemplary embodiment, the acceleration switch 720 will trigger close at 60 or greater g's. This acceleration is greater than the anticipated acceleration at launch or in flight but less than anticipated g's at ordinance impact. In accordance with an exemplary embodiment of the present invention, the battery 710 is small and electronics 700 are relatively low power.

In accordance with one embodiment, a metal proximity sensor 740, senses the presence of metal and outputs a metal present signal when the active tag 700 is attached to the ordinance. The metal sensor may also be encased and connects to the encased processor. In accordance with another embodiment, the receiver of transceiver 760 will be disabled if metal proximity sensor 740 does not detect the presence of ordinance metal. By utilizing a metal proximity detector, localization of tags that have disassociated from their ordinance casings can be avoided. Tag electronics 700 include an encryption and a decryption module 750. An antenna, not shown, connects to transceiver 760. In an embodiment such as that shown in FIGS. 5B and 5C, tag assembly 575 or tag assembly 576 may have an antenna within the tag encasing. While a tag assembly of the embodiment shown and described as a channel mount 525, shown for example in FIG. 5A, will have a connection to an antenna outside of the tag assembly encasing.

FIG. 8A shows a block diagram of a method of attaching a RFID tag to an aft end of a conventional MK 80 series body or equivalent bomb body and assembling a conventional tail assembly onto the tag mounted body, in accordance with an exemplary method of the present invention. After encasing the RFID tag assembly in a polymer, plastic, or epoxy 810, the encased assembly is formed into a rod comprising a polygon cross-section 815. In accordance with an exemplary embodiment, the initial encasing of the tag 810 and the forming of the rod 815 may be done in a single process or single step. In accordance with another embodiment, the tag electronics are first encased and then subsequently the encased electronics are encased again in a forming of the rod process. The rod may be curved to have a radius of curvature near a radius of curvature of a metal ordinance body's aft end 820. By limiting a length of the rod to less than an arc length between adjacent set screws 820, a subsequent tail assembly is readily accommodated. Limiting a height of the rod to a distance between an apex of the v bottom channel and an outer radius of the outer flange, hc, 825 yields a packaged RFID tag assembly, which enables further ordinance assembly. After proper encasing, shaping and sizing, the packaged RFID tag assembly is attached to a v bottom groove between adjacent set screws of an aft body end of the ordinance with an adhesive 830. In alternate embodiments the step of adhesion is omitted. The absence of adhesive may facilitate tag assembly removal during ordinance disassembly.

In an alternate method embodiment, the tag assembly is acquired encased and formed in the desired shape ready for v channel placement. The rod cross section size and shape need not be constant along its length. In accordance with the present invention, the finished rod fits into the v channel and affords mounting of the desired tail assembly as discussed, for example, in relation to FIG. 6B. Any of the corners of the rod, for example any of the three corners of a triangle cross section embodiment may be rounded.

When an antenna is to be attached 835, a flat curved dipole antenna is insulated on both flat sides. In accordance with one exemplary embodiment, one side of the flat curved antenna is laid on and secured to a layer of polyimide tape, having a same flat curved configuration 840. Subsequently, a second flat curved insulator is applied to the exposed side of the flat antenna surface 845. The insulated antenna is placed on the outer surface of aft body end 850. With the antenna in place and electrically connected to the tag assembly 834, the desired tail assembly is mounted onto the aft body end with the set screws straddling the tag assembly 855. Using set screws, the tail assembly is secured to the ordinance 855. In another method embodiment the antenna is acquired in insulated form, such that steps of insulating are not executed. Again, the insulated antenna is mounted after the rod is positioned in the v channel.

Figure 8B:
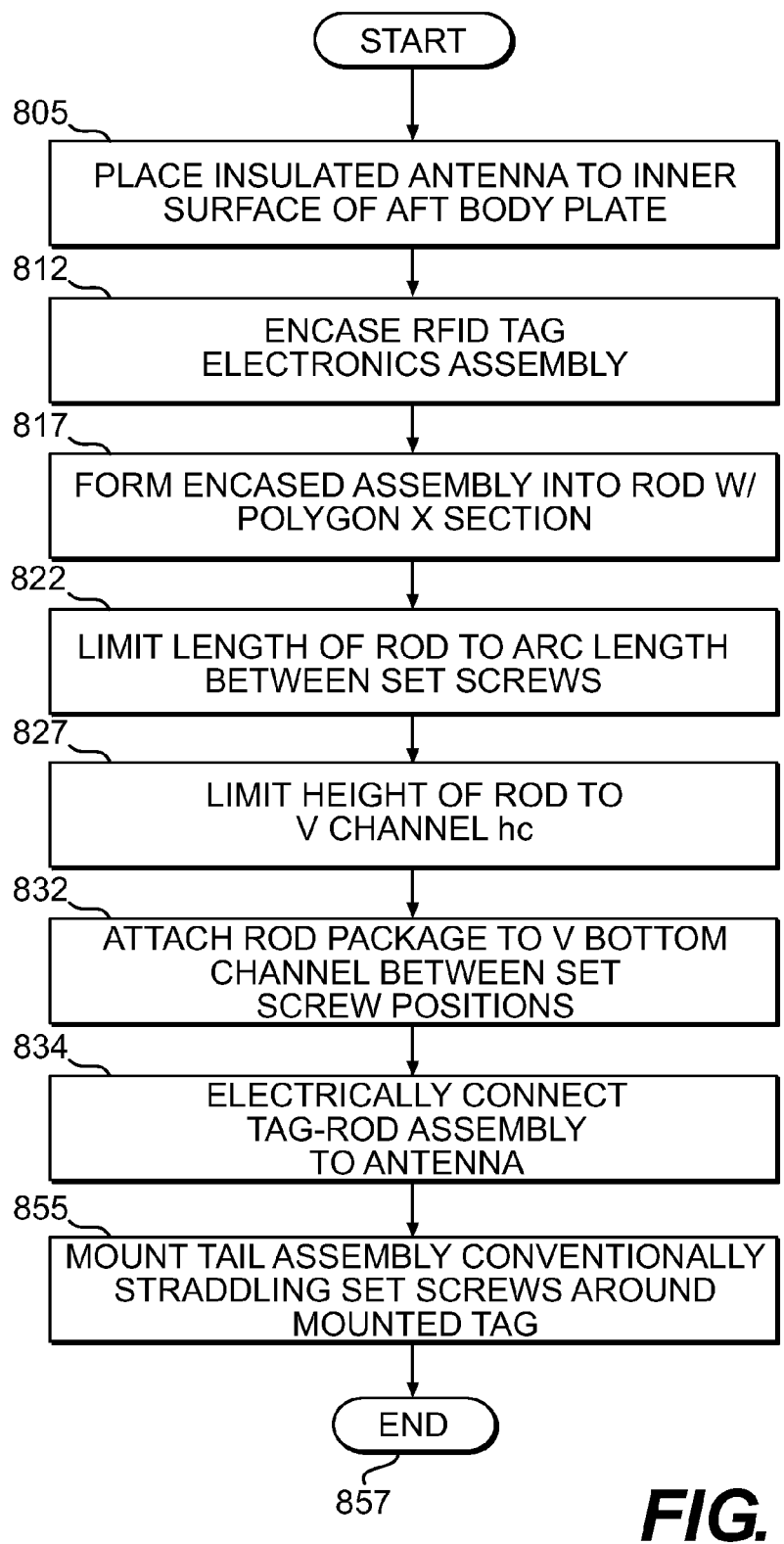
FIG. 8B shows a block diagram of another method of attaching a RFID tag to an aft end of a conventional MK 80 series body or equivalent bomb body and assembling a conventional tail assembly or equivalent onto the tag mounted body, in accordance with another exemplary method of the present invention

In an alternate method embodiment, shown in FIG. 8B, a flat curved insulated antenna is placed on the aft body end of the ordinance 805 before the tag assembly is mounted in the channel. Encasing and rod forming are performed to yield a rod which fits into the v bottom channel 812, 817, 822, 827. The desired rod is placed between two adjacent set screw positions in the channel 832. The antenna is electrically connected to the tag assembly 834. Then, the desired tail assembly is attached by securing set screws 855. In yet another method embodiment, the tag assembly is acquired in an encased rod of the desired shape. A flat curved insulated antenna is placed on the aft body end of the ordinance 805. The rod formed tag assembly is mounted in the v channel on an aft body end in between adjacent set screw positions 832. The antenna is electrically connected to the tag assembly 834. And the desired tail assembly is seated and secured with the eight set screws 855.

Figure 9:
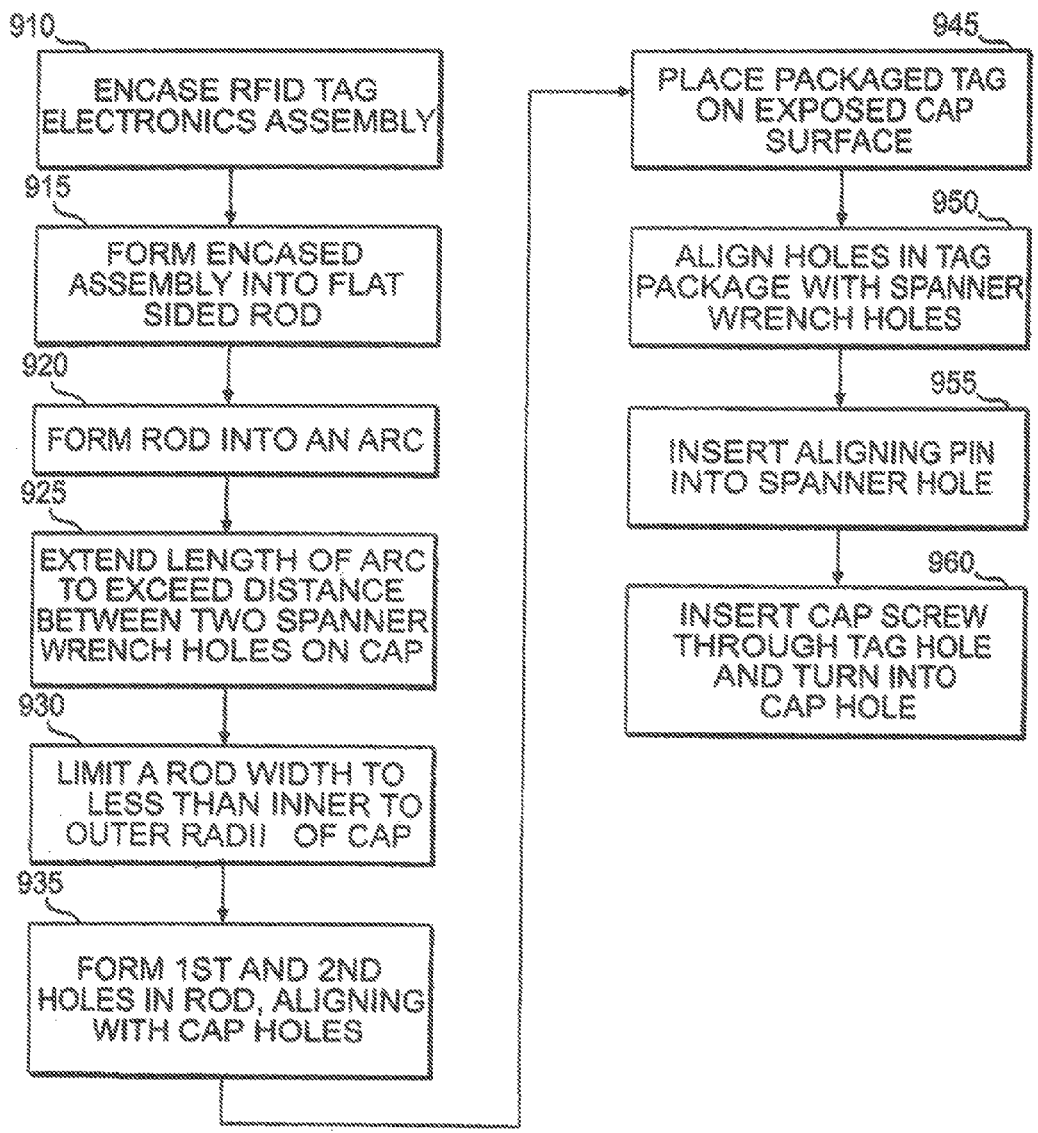
FIG. 9 shows a block diagram of another exemplary method of attaching a RFID tag to the cap on an aft end of a conventional MK 80 series body or equivalent bomb body and assembling a conventional tail assembly or equivalent onto the tag mounted body, in accordance with an exemplary embodiment of the present invention.

FIG. 9 shows a block diagram of another exemplary method of attaching a RFID tag to the cap on an aft end of a conventional MK 80 series body or equivalent bomb body and securing a conventional tail assembly onto the same bomb body, in accordance with an exemplary embodiment of the present invention. Tag electronics are encased in a polymer, plastic or epoxy 910. The encased assembly is formed into a flat sided rod 915. The rod is a curved into an arc having a radius of curvature near a radius of curvature of a metal ordinance cap 920. The length of the curved rod is expanded to exceed an arc length between adjacent cap holes 925. The width of the rod arc is limited to less than a distance from an outer cap radius and an inner cap radius 930. A first hole and a second hole are formed through the rod with a placement such that holes align with the adjacent cap holes 935. The second hole of the rod may be sized to accommodate passage of a threaded cap screw. In still another embodiment, only the latter hole is present to accommodate passage of, for example, a cap screw, while an aligning pin is fabricated into the tag assembly at the position of the would be first hole.

The tag rod is placed on the exposed cap surface 945 aligning the first and second holes through the rod with adjacent holes in the cap 950. An aligning pin is pushed through the first hole in the rod and into a first spanner wrench hole 955. In another embodiment the aligning pin is incorporated into the flat sided rod and is inserted in the spanner wrench hole 955 underneath. A cap screw is inserted through the second hole of the rod and turned into the threaded cap hole underneath, attaching the tag assembly to the ordinance 960. In an alternated method embodiment, the tag assembly is acquired already encased and in the desired rod shape. In turn, the method of mounting the same begins as described above with the tag rod being placed on the exposed cap surface 945 aligning the first and second holes through the rod with adjacent spanner holes in the cap 950. As above, the desired tail assembly is seated and secured with the eight or six set screws, not shown.

In still another cap mounted tag assembly in accordance with an embodiment of the present invention, through holes are present in the tag to align with between two and four large threaded holes in the cap, for example, in a MK 84 cap. For such a cap, multiple cap screws may be employed to secure the tag to the cap.

Figure 10A:
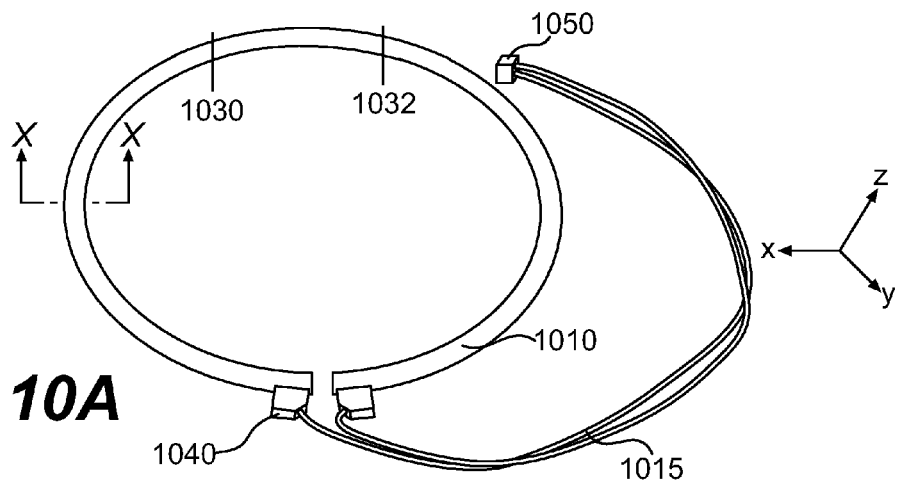
FIG. 10A shows a tag antenna prototype and FIG. 10B shows an apparatus used to verify the feasibility of the prototype design in an ordinance-mounted state, in accordance with an exemplary tagging method and system of the present invention.
Figure 10B:
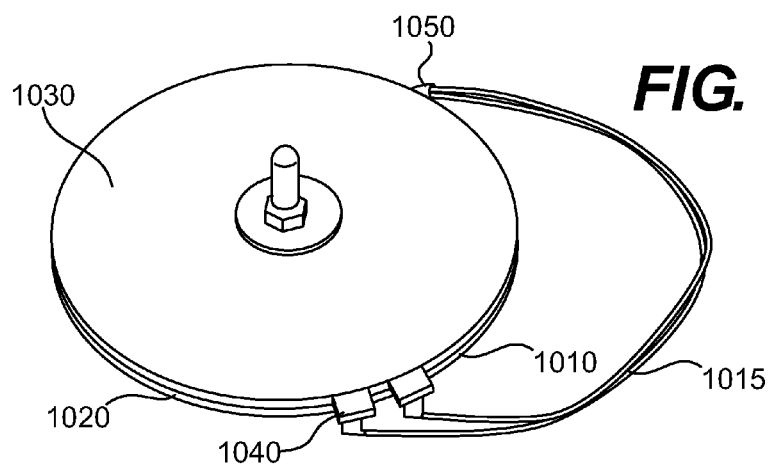

FIG. 10A shows a tag antenna prototype and FIG. 10B shows an apparatus used to test the antenna and its mounting design, in accordance with an exemplary tagging method and system of the present invention. The efficacy of a flat curved antenna mounted between the aft end of a bomb body and a tail assembly to transmit and receive signals was tested experimentally. Points 1030 and 1032 indicate endpoints of the inner curved copper antenna, while the outer insulation is continuous. An antenna embodiment, in accordance with the present invention, comprises curved strips of copper in a dipole curved antenna insulated on each flat side with gasket-like insulation 1010. A lead 1015 was connected to the antenna dipoles 1040 and connected to a radio frequency connector, not shown, on the other end 1050. The radio frequency connector was connected to a network analyzer to evaluate antenna performance. The insulated antenna was placed between two steel plates 1020, 1030. The gap between the steel plates was reduced to approximate the spacing between an aft body end and a mounted tail fin assembly. Desired signal reception quality was verified for distances up to 300 feet. Performance was also evaluated as a function of antenna gap size, the space between end points 1030, 1032. Well performing gap sizes included 0.011 inches, 0.022 inches, 0.033 inches and no space at 0 inches.

Figure 10C:
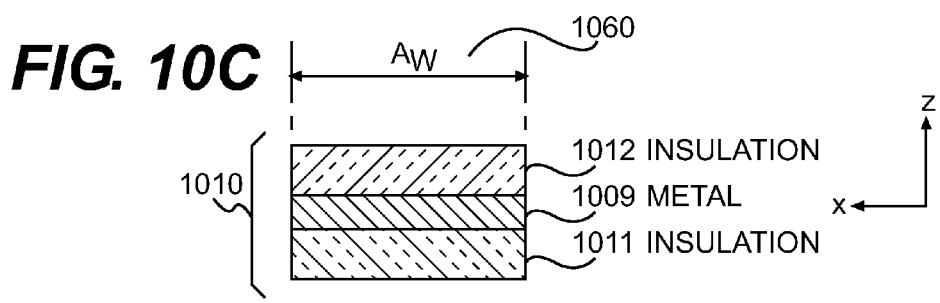
FIG. 10C shows a cross section view of an antenna along line XX of FIG. 10A, in accordance with an exemplary embodiment of the present invention.

FIG. 10C shows a cross section view of an antenna embodiment along line XX of FIG. 10A, in accordance with an exemplary embodiment of the present invention. Insulations 1011, 1012 are attached to either side of copper 1009. An antenna width, Aw, 1060 is set to a height of face 583, 683 of an inner flange, shown in FIGS. 5A and 6B. In alternate embodiments the width of the antenna is less than the height of the inner flange. The front and back insulators 1011, 1012 may be polyimide, biaxially-oriented polyethylene terephthalate, or similar material. In accordance with one exemplary embodiment, the insulating material has a thickness of 0.003 inches. In the prototype design and testing, described above, biaxially-oriented polyethylene terephthalate was used as the insulating material.

Figure 11:
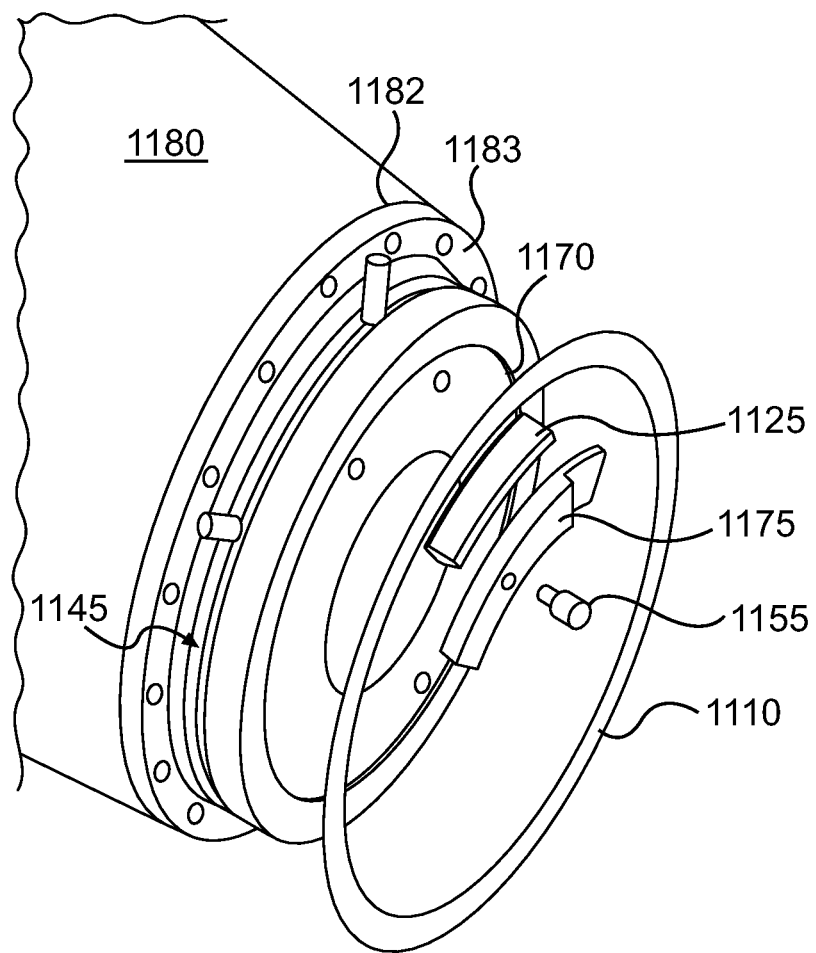
FIG. 11 shows a top exploded view of an antenna, a channel tag, and a cap tag relative to the aft end of a bomb body, an accordance with an exemplary embodiment of the present invention.

FIG. 11 shows a top isometric and exploded view of embodiments of the present invention relative to the aft end of an ordinance and cap. This view provides a view of an antenna 1110, a channel tag 1125, and a cap tag 1175 relative to the aft end 1182 of a bomb body 1180 and a cap 1170. Also shown is a cap screw 1155 which would pass through the cap tag and turn into a threaded hole in the cap 1170. In accordance with an exemplary embodiment of the present invention the electronics of a channel tag 1125 connect to antenna 1110 via a flexible copper foil connector, foil connector not shown. The antenna, foil, and channel tag are all readily encased in, for example, a polymer. The encased three part encased unit with a flexible connection between the antenna and channel rod permits ready bomb assembly with the channel tag 1125 dropping into channel 1145 and antenna 1110 slipping up against 1183, the pair already connected. The foil connector may also have a flexible insulation layer between the foil and encasing polymer.

The system and method in accordance with embodiments of the present invention are readily applied to a multitude of bomb configurations comprising the MK 80 series body, and conventional fin assemblies. Ordnance types compatible with the present invention include the bomb live unit (BLU) series, and BDU practice bombs.

A tag attachment in accordance with an embodiment of the present invention, is shielded, at least in part, from the forces of impact. One embodiment is protected in the v channel of an aft body plate, while other embodiments are mounted to a cap. Both of channel and cap embodiments are enclosed by a tail assembly. A flat curved antenna, which may be used in combination with a channel-mounted tag, may withstand the abrasions of landing. Conventionally the bomb's exterior paint may be abrasively removed during landing. An outer edge of a gasket-like curved antenna, such as that shown in FIGS. 10A and 10C, may be shaved but would still have continuity to transmit and receive signals. In still other embodiments, multiple channel tags and/or multiple cap tags can be mounted on a given ordinance.

The present invention avoids cutting grooves into the bomb body or fin for tag mounting. The tag system and method in accordance with the present invention accommodates the metal casing and metal fins of general purpose bombs, guided ordinances, or metal casing practice bombs. The method and system of tagging described herein maintains the integrity of the bomb.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

REFERENCE LIST

[1] Shubert, K. A., Davis, R. J., Barnum, T. J., Balaban, B. D., Amdor, Sikorski B. J., Peters, T. J. and J. W. Griffin. *Enhanced Electromagnetic Tagging for Embedded Tracking of Munitionsand Ordnance During Future Remediation Efforts*. Final Technical Report; pp 1-3, Jun. 30, 2007.

[2] Id. at page 18.

What is claimed is:

1. An RFID cap tag device for an ordnance, the device comprising:
   a battery;
   a processor;
   an acceleration switch connecting the battery to the processor when closed;
   a decoder and an encoder connected to the processor;
   a transceiver connected to the processor;
   an antenna connected to the transceiver;
   a device casing enclosing at least the battery, the processor, the acceleration switch, the encoder and the decoder, the transceiver, and the antenna;
   an aligning pin configured to insert Into a cap hole;
   a through hole formed in the casing;

wherein, the device casing extends a distance which at least exceeds an arc length between two adjacent cap holes; and wherein the aligning pin and the through hole align with the two adjacent cap holes.

2. The device of claim 1, further comprising:

a cap screw passing through the through hole in the casing and turning into a threaded hole of the adjacent cap holes.

3. The device of claim 1, wherein:

the device casing extends circumferentially around a fuze well of the cap of the ordinance; and wherein the device casing has at least two through holes which align with at least two cap holes of the ordinance.

* * * * *